UNITED STATES PATENT OFFICE.

GILBERT W. BRADLEY, OF SUNDERLAND, VERMONT.

IMPROVEMENT IN MAKING WOODEN BOXES.

Specification forming part of Letters Patent No. 211,130, dated January 7, 1879; Reissue No. 8,890, dated September 9, 1879; application filed August 9, 1879.

*To all whom it may concern:*

Be it known that I, GILBERT W. BRADLEY, of the town of Sunderland, in the county of Bennington and State of Vermont, have invented certain Improvements in the Preparation of the Material for the Rims or Bodies of Cylindrical Boxes, and in the art of constructing boxes wherein such material so prepared is employed, of which the following is a specification.

My invention relates to the construction of that class of cylindrical boxes in which thin veneers bent into cylindrical form are employed for the walls or rims.

The first part of my invention relates to the preparation and bending of such veneers, and the second part to their subsequent incorporation into and the method of completing such boxes.

My mode of preparing the material for the wall or rim of the box is as follows: I select veneers of the wood or woods best suited to the purpose for which the completed box is to be used, and cut to the length, breadth, and thickness desired to form a single rim without subsequent trimming.

It is better that such veneers at this stage have their surfaces at least partially dried, although it is not essential that the material be either wholly or even partially seasoned; but a dried surface contributes to a smoother exterior finish of the rim when the box is completed.

I then accomplish the bending of the veneer by successively passing it through a series of sets of compressing and bending rolls of three rolls to a set. These rolls are similar to the rolls of a tin-pipe former, except that in each successive set the back roll is adjusted higher than in the last preceding set, so as to secure additional pressure upon the material as it is passed through, and at the same time produce additional curvature of the piece undergoing manipulation. The rolls of the last set are so adjusted as to impart to the veneer an extreme pressure, and at the same time bring the piece to the curvature desired in the completion of the box, after allowing for the lap or other equivalent provision for uniting the ends of the rim. This concludes the first step in my process of making boxes.

It will be seen that the end attained—to wit, the production of a permanently bent rim—is attained by passing the originally straight veneer consecutively through sets of rolls adapted to produce in such rim, as the operation progresses, successively decreasing arcs of curvature under gradually-increasing pressures.

By this process of manipulation two new results are effected in the material acted on, which results are mainly attributable to the influence of graded pressure and its mode of application. In the first place the density of the veneer and its degree of thinness are both materially augmented, whereby its strength is correspondingly increased, and, in addition to this, any tendency of the rim to subsequently straighten out by reason of the stretching of the outside fibers and the crimping or compression of the inside fibers, resulting from the operation of bending, is counteracted and prevented by the pressure exercised in the bending process, the tendency of which is to crush and bevel the crimped or corrugated fiber on the inside of the rim, so that its ability to exert any straightening or expansive influence is destroyed.

To box-rims having been so formed tops and bottoms or heads may be applied in various ways well known, and the joint formed by the junction of the two ends of the bent rim may be fastened or secured by any of the well-known methods.

My process for constructing my improved box is substantially as follows: I prepare the rims of both the body and cover of the box in the manner above described, and unite the ends of the box-rims by overlapping and sewing them together. The tops and bottoms are alike, and are each formed as follows: The material is first cut into a disk of the proper size by a cylinder-saw, and is then cut with a smaller cylinder-saw to the proper depth to form a retaining flanged edge. The edge of the disk is then molded, and the included material within the saw-cut to the depth of the same is removed, which leaves both top and bottom ready to receive their respective bodies or rims. The inner surface of the retaining-flange and the edge of the rim are suitably luted with glue, and the two are united by pressing the glued edge of the rim or body into its seat in the top or bottom, as the case may be. Both cover and body are formed in the same way, and together constitute my improved box.

Neither moisture, steam, nor special temperature is indispensable to manipulate veneers by my process of bending, and the peculiarly smooth and burnished surface left on the exterior of the box-rim is vastly superior to surfaces finished with sand-paper, besides obviating the use of sandpapering appliances.

Having thus fully described my invention, what I claim as new, and desire to secure by Letters Patent, is—

1. The hereinbefore-described process of preparing the material for the walls or rims of wooden boxes, consisting in bending wooden veneers into tubular shape under successively decreasing arcs and increasing pressures, substantially in the manner described and set forth.

2. The hereinbefore-described process of making the cylindrical walls or rims of wooden boxes, consisting in bending wooden veneers into tubular shape under successively decreasing arcs and increasing pressures and uniting the overlapped edges, substantially in the manner described and set forth.

3. The herein-described process of forming wooden boxes, which consists in forming the rims for body and cover by bending wooden veneers into tubular shape under successively decreasing arcs and increasing pressures, sewing together the lapped edges of such rims, and providing such cover and body rims, respectively, with a top and bottom, substantially as herein specified.

GILBERT W. BRADLEY.

Witnesses:
FRANKLIN SCOTT,
J. A. WARDELL.